Patented Aug. 31, 1954

2,687,962

UNITED STATES PATENT OFFICE 2,687,962

STABILIZATION OF ORGANIC COMPOUNDS

Joseph A. Chenicek, Bensenville, Ill., assignor to Universal Oil Products Company, Des Plaines, Ill., a corporation of Delaware No Drawing. Application January 19, 1953, Serial No. 332,110

20 Claims. (Cl. 99—163)

This application is a continuation-in-part of my co-pending application Serial Number 264,265, filed December 29, 1951, now abandoned, and relates to the stabilization of organic compounds which tend to deteriorate in storage or in use due to oxidation or other reactions.

The novel method of the present invention may be utilized for the stabilization of various organic compounds which are subject to oxidative deterioration and include motor fuel, particularly unsaturated gasolines as, for example, cracked gasoline and polymer gasoline, diesel oil, mineral oil, lubricating oil, fuel oil, drying oil, edible fats and oils, including those of animal, vegetable or mineral origin, foods, resin, rubber, greases, paraffin waxes, monomers including styrene, butadiene, isoprene, acetylene, amines, and particularly aryl amines as, for example, xylidine, phenylene diamines, aminophenols, etc., alcohols, acids, ketones and other substrates which are adversely affected by oxygen, with the resultant formation of undesirable gum, discoloration, rancidity and other deleterious products.

One object of the present invention is to prevent or at least substantially retard this undesirable deterioration of organic compounds.

Another object of this invention is to provide a novel class of inhibitor which will function to stabilize organic compounds.

Still another object of the present invention is to provide novel compositions of matter.

In one embodiment the present invention relates to a method of stabilizing an organic material subject to oxidative deterioration which comprises adding thereto an inhibitor comprising an N,N'-di-hydroxyphenyl amidine.

In a specific embodiment the present invention relates to a method of stabilizing cracked gasoline which comprises incorporating therein from about 0.0001% to about 0.1% by weight of N,N'-di-p-hydroxyphenyl formamidine.

In another specific embodiment the present invention relates to a method of stabilizing edible fats and oils which comprises incorporating therein from about 0.0001% to about 0.1% by weight of N,N'-di-p-hydroxyphenyl formamidine.

In still another embodiment the present invention relates to novel compositions of matter comprising organic materials subject to oxidative deterioration and an N,N'-di-hydroxyphenyl amidine.

In another specific embodiment the present invention relates to novel compositions of matter comprising cracked gasoline and N,N'-di-p-hydroxyphenyl formamidine.

In still another specific embodiment the present invention relates to a novel composition of matter comprising edible fats and oils and N,N'-di-p-hydroxyphenyl formamidine.

The novel inhibitors of the present invention may be illustrated by the following general formula:

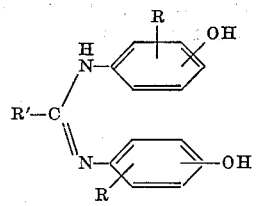

where the hydroxyl groups may be in the ortho, meta, or para positions of the aromatic nuclei with respect to the nitrogen atoms, and where R is hydrogen or an alkyl group such as methyl, ethyl, n-propyl, isopropyl, n-butyl, isobutyl, sec-butyl, tert-butyl, etc. R may also represent 2 or more, and up to 4 alkyl groups attached to the same aromatic nucleus, and it is not meant that only one alkyl group should be thus attached. R' in the above formula represents hydrogen, or an alkyl group, an alkenyl group, an aryl group, an alkaryl group, a cycloalkyl group, an aralkyl group, a heterocyclic group, etc.

When R' in the general formula hereinbefore set forth comprises hydrogen, the compound will be an N,N'-di-hydroxyphenyl formamidine and will include such compounds as N,N'-di-p-hydroxyphenyl formamidine, N,N'-di-o-hydroxyphenyl formamidine and N,N' - di - m - hydroxyphenyl formamidine, as well as those compounds in which one or more substituent groups, in addition to the hydroxyl groups, are attached to one or more of the phenyl rings. When R' comprises a methyl group, the compound will be an N,N'-di-hydroxyphenyl acetamidine and will include such compounds as N,N'-di-p-hydroxyphenyl acetamidine, N,N'-di-o-hydroxyphenyl acetamidine and N,N'-di-m-hydroxyphenyl acetamidine, as well as specific compounds containing one or more substituent groups in addition to the hydroxy groups attached to one or more of the phenyl rings. When R' comprises a propyl group the compound will be an N,N'-di-hydroxyphenyl butyramidine and will include compounds as N,N'-di-p-hydroxyphenyl butyramidine, N,N'-di-o-hydroxyphenyl butyramidine and N,N'-di-m-hydroxyphenyl butyramidine, as well as those substituted in the manner hereinbefore set forth. When R' comprises a butyl group, the compound will be a valeramidine and will include compounds as N,N'-di-p-hydroxyphenyl valeramidine, N,N'-di-o-hydroxyphenyl valeramidine, and N,N'-di-m-hydroxyphenyl valeramidine, as well as substituted derivatives thereof. When R' comprises an amyl group, the compound will be an N,N'-di-hydroxyphenyl caproamidine and include compounds as N,N'-di-p-hydroxyphenyl caproamidine, N,N'-di-o-hydroxyphenyl caproamidine and N,N'-di-m-hydroxyphenyl caproamidine, as well as substituted compounds. It is understood that the specific compounds hereinbefore set forth are representative of the large number of compounds which may be prepared and utilized in accordance with the present invention but not necessarily with equivalent results.

The novel inhibitors of the present invention may be prepared in any suitable manner such as by reacting an alkyl ortho ester with a suitable aminophenol. The alkyl ortho esters are themselves prepared in any suitable manner and as an illustration of such a manner, chloroform can be reacted with sodium ethoxide and the product comprises ethyl ortho formate. Similarly, 1,1,1-trichloroethane can be reacted with sodium ethoxide and the product comprises ethyl ortho acetate. Other suitable alkyl ortho esters may be prepared, and their preparation is readily apparent to one skilled in the art.

The alkyl ortho ester, such as ethyl ortho formate is then mixed with the desired aminophenol. Suitable aminophenols include o-aminophenol, m-aminophenol, p-aminophenol, o-methyl-p-aminophenol, o-ethyl-p-aminophenol, o-propyl-p-aminophenol, o-butyl-p-aminophenol, etc., p-methyl-o-aminophenol, p-ethyl-o-aminophenol, p-propyl-o-aminophenol, p-butyl-o-aminophenol, etc. The above illustrated aminophenols are mentioned merly for the purpose of illustration and no intention is meant thereby to limit the generally broad scope of the present invention.

In preparing the novel inhibitors of the present invention it is usually desirable to mix about 2 molecular quantities of the desired aminophenol with 1 molecular quantity of the alkyl ortho ester. The condensation usually proceeds readily at low temperatures, and in particular around 100° C., although higher or lower temperatures may be used, as may be desirable with the particular reactants utilized. After the condensation reaction has been completed, the water formed as one product of the reaction is usually removed, for instance by distillation, and the solid condensation product remaining is then recrystallized from a suitable media, such as ethyl alcohol or propyl alcohol.

The inhibitors of the present invention will usually be employed in an amount of less than 0.5% by weight and generally will be used in an amount of from about 0.0001% to about 0.1% by weight. The exact amount of the inhibitor ordinarily will depend upon the particular organic compound being treated and the stability desired. These inhibitors may also be employed in conjunction with various dyes, antiknock agents, such as tetra ethyl lead, metal deactivators, synergists, or other additives employed for specific purposes.

The following examples are introduced to illustrate further the novelty and utility of the present invention but not with the intention of unduly limiting the same.

N,N'-di-p-hydroxyphenyl formamidine was prepared as follows: 14 grams of ethyl ortho formate and 21 grams of p-aminophenol were placed in a 100 ml. flask and heated together on a steam bath for one hour. At the end of this period the reaction product was dissolved in hot isopropyl alcohol and on cooling, crystals of the desired N,N'-di-p-hydroxyphenyl formamidine separated out. These crystals had a melting point of 120–130° C. and on further heating effervesced at 180–190° C.

EXAMPLE I

A sample of the above compound was tested in a Pennsylvania cracked gasoline which had a non-inhibited induction period of 60 minutes. The induction period is determined by the Oxygen Bomb Stability Test which is a standard method of evaluating the storage stability of gasoline. The results of these tests are presented in the following table:

Table

| | Concentration, Weight Percent | Induction Period, Min. |
|---|---|---|
| Gasoline+N,N'-di-p-hydroxyphenyl formamidine | 0.0025 | 345 |
| | 0.005 | 510 |
| | 0.0075 | 640 |
| | 0.01 | 685 |

These data indicate that N,N'-di-p-hydroxyphenyl formamidine is a very potent antioxidant in gasoline for retarding the development of oxidative deterioration.

EXAMPLE II

A sample of the compound prepared in the above manner was utilized to stabilize lard. The lard had a normal stability of 7 hours as determined by the Active Oxygen Method. This test is described in detail in the article by A. E. King et al. which appeared in Oil And Soap volume 10, No. 6, pages 105–109 (1933). In general this test comprises bubbling air through a sample of the lard until rancidity is determined organoleptically and by peroxide values. When 0.01% of the above compound was added to a sample of the lard, the lard did not become rancid until after 22 hours time.

EXAMPLE III

Styrene may be stabilized by the addition thereto of 0.02% by weight of N,N'-di-p-hydroxyphenyl acetamidine. The effectiveness of the inhibitor may be determined in the following manner. A sample of the styrene and another sample of the styrene containing 0.02% by weight of N,N'-di-p-hydroxyphenyl acetamidine are each sealed in separate small glass tubes having long, thin necks. The tubes may be heated at 80° C. for 10 hours or at a higher temperature and/or longer period of time if required. Periodically the tubes may be inverted and the change in viscosity is determined by observing "bubble time," that is, the time necessary for a bubble to rise to the top of the thin neck when the tube is inverted at 25° C. Increase in viscosity indicates deterioration of the sample caused by oxidative deterioration, gum formation, polymerization, etc.

EXAMPLE IV

This example illustrates the use of an inhibitor of the present invention in the stabilization of rubber. 0.4% by weight of N,N'-di-p-hydroxyphenyl propionamidine is added to the latex resulting from the emulsion polymerization of butadiene and styrene, after which the latex is coagulated and dried. The rubber so produced will be improved as to color, strength, elasticity, etc.

I claim as my invention:

1. A method of stabilizing an organic material subject to oxidative deterioration which comprises adding thereto an inhibitor comprising an N,N'-di-hydroxyphenyl amidine.

2. A method of stabilizing an organic material subject to oxidative deterioration which comprises adding thereto an inhibitor comprising an N,N'-di-p-hydroxyphenyl formamidine.

3. A method of stabilizing an organic material subject to oxidative deterioration which comprises adding thereto an inhibitor comprising an N,N'-di-p-hydroxyphenyl acetamidine.

4. A method of stabilizing an organic material subject to oxidative deterioration which comprises adding thereto an inhibitor comprising an N,N'-di-p-hydroxyphenyl propionamidine.

5. A method of stabilizing gasoline subject to oxidative deterioration which comprises adding thereto an inhibitor comprising N,N'-di-hydroxyphenyl amidine.

6. A method of stabilizing cracked gasoline against deterioration by oxygen which comprises adding thereto from about 0.0001% to about 0.1% by weight of N,N'-di-p-hydroxyphenyl formamidine.

7. A method of stabilizing edible fats and oils subject to oxidative deterioration which comprises adding thereto an inhibitor comprising an N,N'-di-hydroxyphenyl amidine.

8. A method of stabilizing lard against deterioration by oxygen which comprises adding thereto from about 0.0001% to about 0.1% by weight of N,N'-di-p-hydroxyphenyl formamidine.

9. An organic compound tending to deteriorate due to oxygen containing an N,N'-di-hydroxyphenyl amidine in an amount sufficient to retard said deterioration.

10. An organic compound tending to deteriorate due to oxygen containing an N,N'-di-p-hydroxyphenyl formamidine in an amount sufficient to retard said deterioration.

11. An organic compound tending to deteriorate due to oxygen containing an N,N'-di-p-hydroxyphenyl acetamidine in an amount sufficient to retard said deterioration.

12. An organic compound tending to deteriorate due to oxygen containing an N,N'-di-p-hydroxyphenyl propionamidine in an amount sufficient to retard said deterioration.

13. Cracked gasoline tending to deteriorate due to oxygen containing from about 0.0001% to about 0.1% by weight of an N,N'-di-hydroxyphenyl amidine in an amount sufficient to retard said deterioration.

14. Cracked gasoline tending to deteriorate due to oxygen containing from about 0.0001% to about 0.1% by weight of N,N'-di-p-hydroxyphenyl formamidine in an amount sufficient to retard said deterioration.

15. Gasoline containing an inhibitor for oxidative deterioration comprising an N,N'-di-hydroxyphenyl amidine in an amount sufficient to retard said deterioration.

16. Gasoline containing an inhibitor for oxidative deterioration comprising an N,N'-di-p-hydroxyphenyl formamidine in an amount sufficient to retard said deterioration.

17. Edible fats and oils containing an inhibitor for oxidative deterioration comprising an N,N'-di-hydroxyphenyl amidine in an amount sufficient to retard said deterioration.

18. Lard containing an inhibitor for oxidative deterioration comprising an N,N'-di-hydroxyphenyl amidine in an amount sufficient to retard said deterioration.

19. Edible fats and oils containing an inhibitor for oxidative deterioration comprising from about 0.0001% to about 0.1% by weight of N,N'-di-p-hydroxyphenyl formamidine in an amount sufficient to retard said deterioration.

20. Lard containing an inhibitor for oxidative deterioration comprising from about 0.0001% to about 0.1% by weight of N,N'-di-p-hydroxyphenyl formamidine in an amount sufficient to retard said deterioration.

No references cited.